Oct. 14, 1952 W. L. GASKELL 2,613,556
DRILL PRESS
Filed March 24, 1947

INVENTOR.
Walter L. Gaskell
BY
Harness, Dickey & Pierce
ATTORNEYS.

Patented Oct. 14, 1952

2,613,556

UNITED STATES PATENT OFFICE 2,613,556

DRILL PRESS

Walter L. Gaskell, Ypsilanti, Mich., assignor to King-Seeley Corporation, Ann Arbor, Mich., a corporation of Michigan Application March 24, 1947, Serial No. 736,795

5 Claims. (Cl. 77—36)

This invention relates generally to drill presses, and more particularly to an improved spindle feed mechanism therefor.

The principal objects of this invention are to provide torsional spring means for returning a drill press spindle to its uppermost position after it has been lowered and released; to provide means for adjusting the force exerted by the aforementioned spring; to provide a drill press head construction in which the aforementioned torsional spring is completely received within a hollow pinion shaft which operates to raise or lower the drill press spindle so as to permit use of a long spring in which stress is not greatly built up, in lowering the spindle; to provide a hand lever mounted in the outer end of the aforementioned hollow pinion shaft which is frictionally held against inadvertent movement with respect thereto; to provide means mounted in the outer end of the aforementioned hollow pinion shaft which anchors one end of said torsional spring and which contains spring pressed friction means for frictionally holding the aforementioned hand lever against gravitational movement and in axially adjusted position, and so that said means and pinion shaft are secured together by said hand lever; and to provide a drill press head which is more efficient in operation, inexpensive to manufacture, and rugged in construction.

Figure 1:
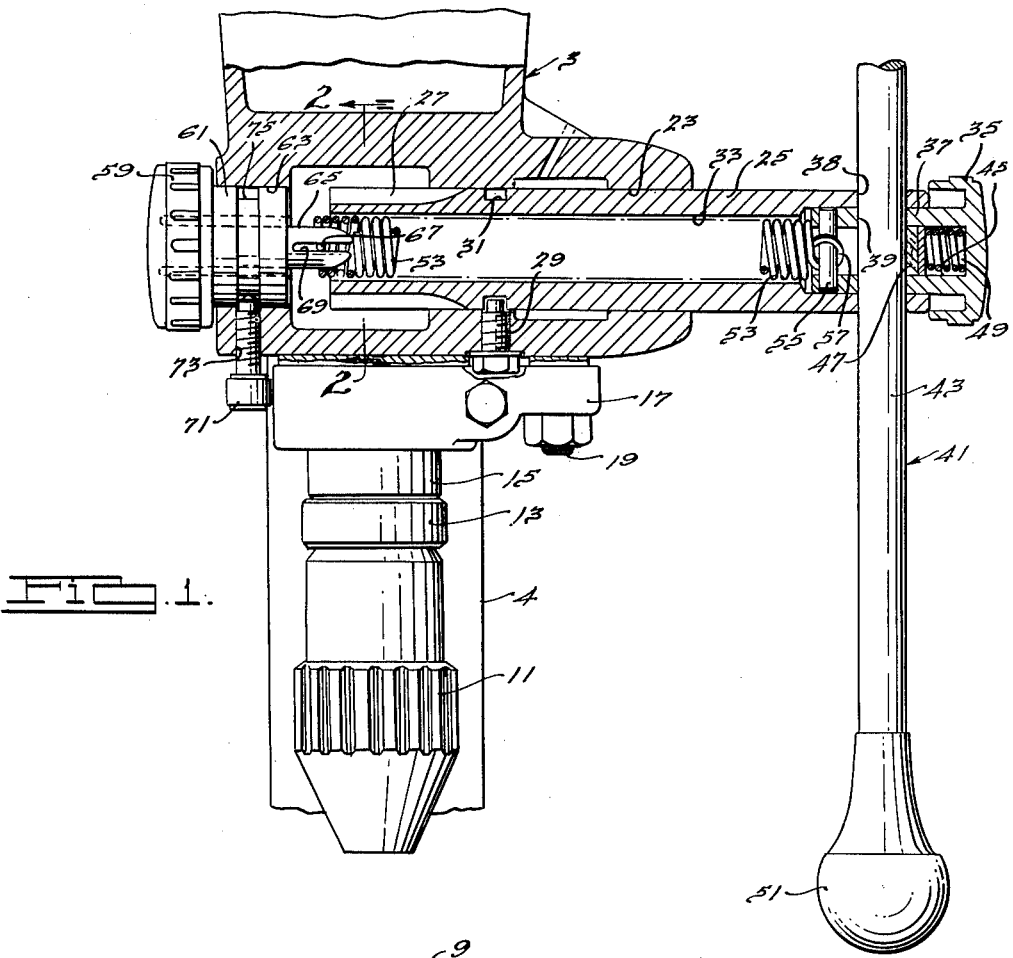
Figure 2:
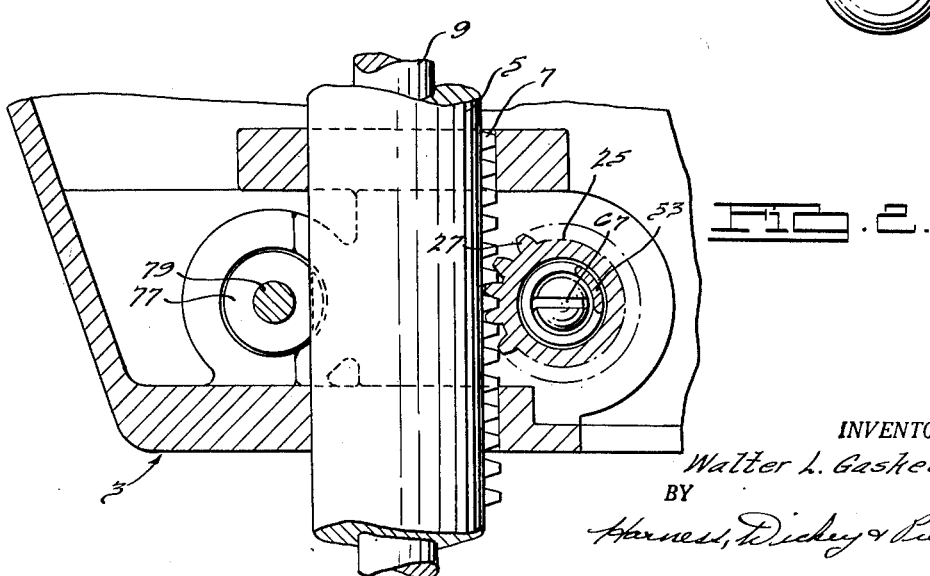

These and other objects of this invention will become apparent from the following detailed description taken in conjunction with the accompanying drawings in which:

Figure 1 is a sectional view of a portion of a drill press head embodying the present invention; and Fig. 2 is an enlarged vertical sectional view taken on the line 2—2 of Fig. 1.

Referring now to the drawing, it will be seen that a more or less conventionally shaped cast drill press head 3 is provided which is adapted for use on a drill press in a conventional manner as by being vertically adjustably secured to a cylindrical column or post 4. Mounted within the drill press head 3 for vertical movement is a quill 5 having a plurality of longitudinally spaced rack teeth 7 formed on the rear portion of the outer periphery thereof. Rotatably received in the quill 5, and held against axial movement with respect thereto by any suitable means, is a spindle 9, the upper end of which is conventionally connected to a driving means, as for instance an electric motor, by means of a belt, pulleys or the like. The lower end of the spindle 9 has a conventional chuck 11 connected thereto by any suitable means. A conventional back-off nut 13 is shown as being provided between the chuck 11 and a thrust bearing 15 on the lower end of the spindle 9. A feed stop bracket 17 is clamped about the lower end of the quill 5 and outwardly spaced from the head 3 carries a vertically directed feed stop rod 19 on which feed stop nuts (not shown) are threadably received for limiting downward movement of the spindle 9 and chuck 11 with respect to the head 3 in accordance with conventional practice.

Received in a transversely extending bore 23, within the head 3, is a hollow pinion shaft 25, the inner end of which is machined to form a pinion gear 27 which operatively meshes with the rack teeth 7 on the quill 5 so that rotation of the shaft 25 will cause vertical movement of the quill 5 and spindle 9. The hollow pinion shaft 25 is held against axial movement within the head 3 by means of a dog end screw 29, the inner end of which is freely received in an annular groove 31 formed in the outer periphery of the shaft 25.

Mounted in the outer end of the bore 33 of the pinion shaft 25 is a knob 35 which has a hollow shank portion 37 which is relatively closely received within the bore 33. A transverse aperture 38 is provided adjacent the outer end of the pinion shaft 25, and the shank portion 37 of the knob has an aperture 39 therein which when aligned with the aperture 38 provides a through aperture within which a hand lever 41, having a cylindrical body portion 43, is slidably received. The hand lever 41 locks the knob 35 to the pinion shaft 25 to prevent both axial and rotational movement therebetween, thus causing them to rotate together as a single unit.

Disposed in the outer end of the hollow bore 45 of the knob 35 is a friction plate 47 adapted to abut the hand lever body 43. Compressed between the blind end of the bore 45 and the friction plate 47 is a coil spring 49, which urges the friction plate against the hand lever so as to hold it against gravitational movement with respect to the pinion shaft 25. Without suitable holding means, the hand lever would normally drop down until one of the enlarged handgrip elements 51, which are threaded on each end of the lever body, abuts the pinion shaft 25.

Received within the pinion shaft hollow bore 33 is a coil spring 53, the outer end of which is reversely looped about a pin 55, which is secured in and across the inner end of the shank portion of the knob 35, as at 57. Rotatably mounted in the opposite side of the head 3 is a knob 59 which has an inwardly extending cylindrical shank portion 61 which is received within an aperture 63 in the head, axially aligned with the pinion shaft 25. Extending axially inwardly from the inner face of the shank portion 61 is a forked end portion 65 which projects into the inner end of the bore 33 of the pinion shaft 25, and within the coil spring 53. The corresponding end of the coil spring 53 is bent transversely across the end coil thereof as at 67, and is received within the central recess 69 of the knob forked end 65 to thereby connect the spring end 67 to the knob 59 against relative rotation. By turning the knob 59, initial tensioning of the spring can be obtained so that the spring will properly return the spindle to its uppermost position after it has been lowered and released. Likewise, the torsional value of the spring 53 can be adjusted by turning the knob 59 so to thereby wind or unwind the spring within the pinion shaft. Due to the construction of the head 3 and the fact that the spring is disposed within the pinion shaft, the use of a long spring is permitted in which stress is not greatly built up in lowering the spindle, and this arrangement avoids high stressing of the spring which occurs in using conventional spiral return springs. In order to hold the knob 59 in its rotatably adjusted position and also to prevent axial movement thereof in the head 3, a dog end screw 71 is provided which is threadably received in a tapped aperture 73 in the head so that the inner dog end thereof is received within and bears against a circumferential groove 75 formed in the outer periphery of the knob shank portion 61.

Therefore, when it is desired to move the chuck 11 toward a workpiece, the hand lever 41 is rotated and thereby causes rotation of the pinion shaft 25 which in turn, due to the pinion 27 formed on the inner end thereof, moves the quill 5, the chuck 11 and spindle 9 downwardly toward the workpiece. This rotation will cause the torsion spring 53 to wind and when the hand lever 41 is released after the drilling operation has been completed, the spring will unwind and cause the pinion shaft to rotate in the opposite direction and thus move the quill 5 and chuck 11 upwardly to their uppermost position as shown in Fig. 1.

In order to prevent vertical movement of the quill 5, if desired, a pair of conventional quill lock sleeves 77 are provided which are mounted on a quill lock stem 79 in a conventional manner, and are adapted to be actuated by a quill lock handle (not shown), for frictionally engaging the quill 5 and preventing movement thereof by the hand lever 41 and pinion shaft 25.

It will therefore be seen that a drill press head construction is provided in which the spindle will be automatically returned to its uppermost position, after being lowered, by means of a torsion spring which is completely enclosed within the pinion shaft so that its torsional value may be adjusted by means of the knob 59. Likewise it will be seen that means for frictionally engaging and holding the hand lever 41 are provided, and constructed in such a manner that the hand lever also acts to lock the knob 35 to the pinion shaft.

I claim:

1. In a drill press, a head, a quill mounted for vertical movement in said head and having a longitudinally extending rack formed thereon, a hollow pinion shaft rotatably mounted in said head in transverse relation to said quill and having teeth formed on one end thereof operatively meshing with said rack, a knob having a hollow cylindrical shank portion slidably received in the outer end of said hollow pinion shaft, said shaft and knob shank portion having aligned transverse apertures therethrough, a hand lever slidably received in said apertures and locking said knob to said shaft, a coil spring disposed in said hollow pinion shaft, a pin secured in the inner end of said knob shank portion having one end of said coil spring secured thereto, a second knob rotatably mounted in said head adjacent the opposite end of said hollow pinion shaft having a forked inner end received in said hollow pinion shaft and receiving the opposite end of said coil spring therein for adjusting the torsional value thereof, and means for holding said knob in its adjusted position.

2. In a drill press or the like having a frame and a quill mounted in the frame for reciprocating axial movement, the combination of means reciprocating the quill comprising a rack on the quill, a hollow shaft rotatably mounted in the frame on an axis transverse to the axis of the quill and having peripheral gear teeth at one axial end thereof in driving engagement with the rack, the other axial end of the shaft remote from the gear teeth extending outside of the frame, an axially removable plug inserted in the other axial end of the shaft, said plug and shaft having aligned transverse apertures outside the frame adjacent the end of the shaft remote from the gear teeth, and a lever extending through said apertures to provide means whereby the shaft may be rotated to reciprocate the quill and to also provide means for retaining the plug in the shaft against axial or rotary movement relative to the shaft, and means yieldably resisting axial movement of the quill in one direction comprising a length of coil spring in the hollow shaft, an anchor connection between the spring and frame at the end of the spring adjacent the rack and gear teeth, an anchor connection between the other end of the spring and the plug whereby force applied to the lever is transmitted through the plug to the spring and thus energizes the spring so that the spring resists axial movement of the quill in one direction but energizes it in the opposite direction.

3. The invention set forth in claim 2 wherein the anchor connection between the spring and frame comprises a rotatable and removable plug mounted on the frame in alignment with the hollow shaft and having a spring receiving end portion and including means securing the plug to the frame to selectively prevent removal and rotation of said plug.

4. The invention set forth in claim 3 wherein said last mentioned plug has side portions embracing the end of the spring, said side portions having longitudinal slots therein receiving a bent end of the spring whereby the spring may be secured to the plug by axial movement thereof in said hollow shaft.

5. The invention set forth in claim 2 wherein the anchor connection between the plug and spring comprises a bent loop on the end of the spring extending into a hollow portion of the plug and a cross pin in the plug passing across the hollow portion and through said loop.

WALTER L. GASKELL.

REFERENCES CITED

The following references are of record in the file of this patent:

UNITED STATES PATENTS

| Number | Name | Date |
| --- | --- | --- |
| Re. 15,093 | Fullenwider | Apr. 26, 1921 |
| 793,873 | Cornell | July 4, 1905 |
| 825,273 | Henry | July 3, 1906 |
| 849,792 | Jowitt | Apr. 9, 1907 |
| 1,512,136 | Rechel | Oct. 21, 1924 |
| 1,822,231 | Meunier | Sept. 8, 1931 |